United States Patent Office 2,831,790
Patented Apr. 22, 1958

2,831,790

WELDING FLUX

William Idwal Pumphrey, Gt. Amwell, and David Benjamin Jeffrey Thomas, Hoddesdon, England, assignors, by mesne assignments, to Murex Welding Processes Limited, Waltham Cross, England, a corporation of Great Britain No Drawing. Application October 6, 1955
Serial No. 539,018

10 Claims. (Cl. 148—23)

This invention relates to a flux suitable for use in submerged arc welding.

In submerged arc welding the flux, in the form of a dry free-flowing powder, is deposited in the path to be followed by the welding electrode in a depth sufficient to cover the end of the electrode. The furrow ploughed by the electrode is filled in by the free-flowing powder which thereby provides a protective blanket over the pool of molten metal formed in the weld area surrounding the tip of the electrode.

Suitable fluxes are commonly prepared by grinding and blending naturally occurring minerals such as quartz and dolomite or fused mixtures of compounds such as metal silicates. The free-flowing properties of such powdery mixtures may be improved by mixing with a binder or by forming a frit.

The present invention is based on the discovery that waste metallurgical slags are suitable materials for use in a welding flux used in this method of welding.

Ferro-molybdenum slag has been found to be a suitable blanketing material in this form of welding flux. This material which has hitherto been a waste metallurgical product is of a homogeneous character and regular in quality, is largely non-hygroscopic and hence stable in storage and, when of a particular particle size range, has free-flowing characteristics which render the use of a binder or the forming of a frit unnecessary.

The flux is improved if it contains, in addition to the ferro-molybdenum slag, up to 35% of a fluxing agent, slagging agent or slag forming material and arc stabiliser such as rutile concentrates, zircon, rutile or ilmenite concentrates and/or up to 35% roasted manganese ore to establish proper viscosity equilibria conditions between slag and weld metal. The fluxing agent tends to melt in advance of the arc and to maintain the flux in position until the arc has passed through. The addition of rutile to the flux also improves the surface of the weld and it is possible that it functions as a wetting agent on the surface of the molten metal.

It has also been found that up to 15% of ferro-titanium slag may be added to the flux as an alternative source of oxide of titanium.

Suitable fluxes based on ferro-molybdenum slag have compositions lying within the following ranges:

| | Percent |
|---|---|
| A. Ferro-molybdenum slag | 70–100 |
| Roasted manganese ore | 0–30 |
| B. Ferro-molybdenum slag | 70–100 |
| Unground rutile concentrates | 0–30 |
| C. Ferro-molybdenum slag | 50–70 |
| Unground rutile concentrates | 0–30 |
| Roasted manganese ore | 14–30 |
| D. Ferro-molybdenum slag | 50–70 |
| Ferro-titanium slag | 0–15 |
| Unground rutile concentrates | 0–30 |
| Roasted manganese ore | 14–30 |

Typical examples selected from these ranges are:

| | Percent |
|---|---|
| (1) Ferro-molybdenum slag (20 x 100 mesh) | 70 |
| Roasted manganese ore (20 x 100 mesh) | 30 |
| (2) Ferro-molybdenum slag (20 x 100 mesh) | 70 |
| Unground rutile concentrates (85 x 150 mesh) | 30 |
| (3) Ferro-molybdenum slag (20 x 100 mesh) | 50 |
| Unground rutile concentrates (85 x 150 mesh) | 20 |
| Roasted manganese ore (20 x 100 mesh) | 30 |
| (4) Ferro-molybdenum slag (20 x 100 mesh) | 60 |
| Ferro-titanium slag (20 x 100 mesh) | 5 |
| Unground rutile concentrates (85 x 150 mesh) | 10 |
| Roasted manganese ore (20 x 100 mesh) | 25 |

These fluxes are capable of giving welds free from transverse markings and other surface irregularities and possessing good profiles.

An addition of up to 50% by weight, based on the total flux composition, of ferro-molybdenum slag in ground form can be made to other submerged arc welding fluxes with no deterioration in the appearance of the weld deposit.

According to a further feature of our invention, the addition of alloying metals, or their ferro alloys or carbides, may with advantage be made to the fluxes hereinbefore described; thus, by suitably adjusting the amount and nature of alloying ingredients in the flux in relation to the desired weld composition it is possible to obtain satisfactory weld deposits with a plain mild steel electrode wire. Alloy steel electrode wires can be used in conjunction with said fluxes but in general it will be more advantageous to use a plain mild steel electrode wire and obtain the desired alloying ingredients in the weld deposit substantially entirely from the flux.

By suitable selection of alloying additions it is possible to produce hardfacing deposits of pleasing appearance and good profile, free from surface irregularities and of any desired hardness and composition.

Examples of fluxes according to this feature of the invention, capable of producing deposits of specific hardness when used with a plain carbon mild steel electrode wire, are as follows:

| Flux composition | | Percent | Hardness, Vickers Pyramid Number (30 kg. load) |
|---|---|---|---|
| 1 | Ferro-molybdenum slag | 50 | 250 |
| | Ferro-titanium slag | 4 | |
| | Unground rutile concentrates | 8 | |
| | Roasted manganese ore | 20 | |
| | Ferro manganese | 5 | |
| | Chromium | 5 | |
| | Bauxite | 8 | |
| 2 | Ferro-molybdenum slag | 45.5 | 350 |
| | Ferro-titanium slag | 4 | |
| | Unground rutile concentrates | 7.5 | |
| | Roasted manganese ore | 19 | |
| | Ferro manganese | 8 | |
| | Chromium | 8 | |
| | Bauxite | 8 | |
| 3 | Ferro-molybdenum slag | 41.5 | 450 |
| | Ferro-titanium slag | 3.5 | |
| | Unground rutile concentrates | 7 | |
| | Roasted manganese ore | 17 | |
| | Ferro manganese | 14 | |
| | Carbon chrome | 7 | |
| | Bauxite | 10 | |
| 4 | Ferro-molybdenum slag | 48 | 650 |
| | Ferro-titanium slag | 4 | |
| | Unground rutile concentrates | 8 | |
| | Roasted manganese ore | 20 | |
| | Carbon | 2 | |
| | Ferro manganese | 6 | |
| | Chromium | 4 | |
| | Ferro-manganese-aluminium | 8 | |

An example of a flux suitable for the welding of 18/8 stainless steel using a plain carbon mild steel electrode wire is as follows:

| | Percent |
|---|---|
| Ferro-molybdenum slag | 40 |
| Ferro-titanium slag | 3 |
| Unground rutile concentrates | 6 |
| Roasted manganese ore | 16 |
| Ferro chromium | 25 |
| Nickel | 10 |

What we claim is:

1. A flux suitable for use in submerged arc welding, said flux consisting essentially of ferro-molybdenum slag.
2. A flux according to claim 1 including up to 35% by weight of roasted manganese ore.
3. A flux according to claim 1 wherein said slag has a particle size of 20 x 100 mesh.
4. A flux suitable for use in submerged arc welding, said flux consisting essentially of from 70–100% by weight of ferro-molybdenum slag and from 0–30% by weight of roasted manganese ore.
5. A flux suitable for use in submerged arc welding, said flux consisting essentially of from 70–100% by weight of ferro-molybdenum slag and from 0–30% by weight of unground rutile concentrates.
6. A flux according to claim 1 including up to 35% by weight of rutile.
7. A flux according to claim 1 including up to 35% by weight of zircon.
8. A flux according to claim 1 including up to 35% by weight of an ilmenite concentrate.
9. A flux according to claim 1 including a material selected from the group consisting of nickel, chromium and ferro chromium.
10. A flux according to claim 1 including up to 15% by weight of ferro-titanium slag.

References Cited in the file of this patent

UNITED STATES PATENTS

| 2,681,875 | Stringham | June 22, 1954 |
| 2,725,287 | Cronin | Nov. 29, 1955 |

FOREIGN PATENTS

| 479,376 | Great Britain | Feb. 4, 1938 |